United States Patent [19]
Padilla

[11] 3,809,211
[45] May 7, 1974

[54] CONVEYOR SYSTEM

[76] Inventor: Benjamin A. Padilla, 314 Illinois Ave., Maumee, Ohio 43537

[22] Filed: Dec. 14, 1971

[21] Appl. No.: 207,767

[52] U.S. Cl............ 198/192 R, 198/202, 198/230
[51] Int. Cl............................................ B65g 15/08
[58] Field of Search....... 198/192, 46, 47, 230, 204, 198/202, 192 A, 192 R

[56] References Cited
UNITED STATES PATENTS

| | | | |
|---|---|---|---|
| 3,217,862 | 11/1965 | Herrmann | 198/192 |
| 3,292,771 | 12/1966 | Reilly | 198/192 |
| 897,955 | 9/1908 | Barrett et al. | 198/230 |
| 1,580,615 | 4/1926 | Landahl | 198/192 |
| 3,064,832 | 11/1962 | Heltzel | 198/47 |
| 2,851,151 | 9/1958 | McCallum | 198/192 A |
| 2,012,089 | 8/1935 | Sayers | 198/202 |
| 3,215,257 | 11/1965 | Albers | 198/204 |
| 3,292,773 | 12/1966 | Keehart et al. | 198/204 |
| 3,055,229 | 9/1962 | Mecham | 198/230 |

FOREIGN PATENTS OR APPLICATIONS

| | | | |
|---|---|---|---|
| 123,901 | 4/1947 | Australia | 198/192 |
| 1,051,538 | 12/1966 | Great Britain | 198/204 |

Primary Examiner—Richard E. Aegerter
Assistant Examiner—Joseph E. Valenza
Attorney, Agent, or Firm—Allen D. Gutchess, Jr.

[57] ABSTRACT

An enclosed conveyor system is provided, especially designed for conveying grain or similar materials with which air-borne fines or dust is a problem. The conveyor is totally enclosed thereby to eliminate the hazards of grain dust and the need for an expensive air-suction system. The dust is retained within the enclosure and is returned to the conveyor to substantially reduce the losses otherwise incurred. Idlers for the belt of the conveyor are rigidly supported from the side or above and the return run of the belt is located directly below the upper run to receive any spills. The return run of the belt is supported on a flat bottom wall of the enclosure with no idlers being used. This reduces expense and also substantially decreases the overall height of the conveyor. The spills and dust are collected at the tail pulley of the conveyor and returned to the upper run of the conveyor belt. The enclosed conveyor also employs unique self-aligning idler assemblies which are pivotally supported from the top wall of the enclosure.

3 Claims, 10 Drawing Figures

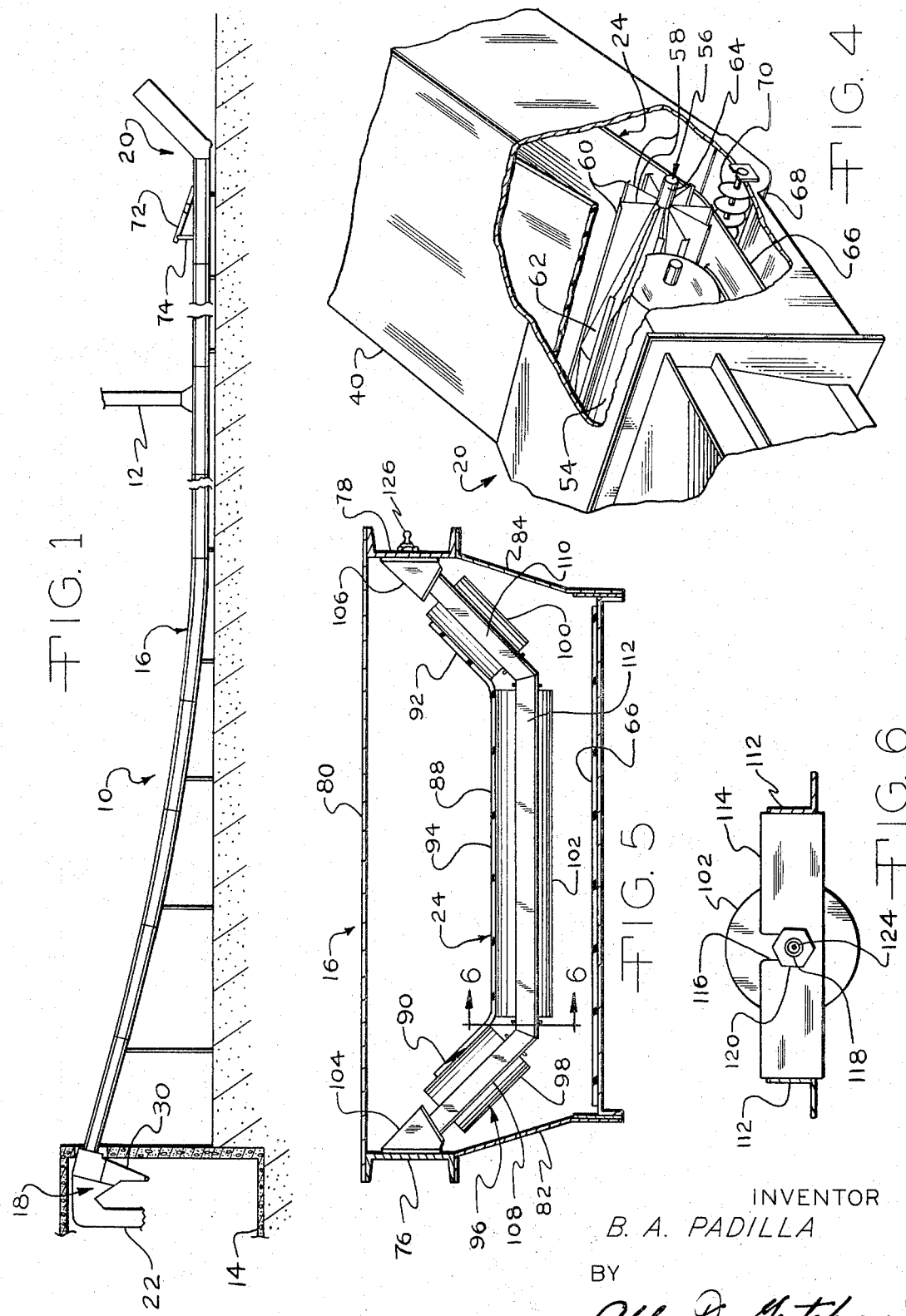

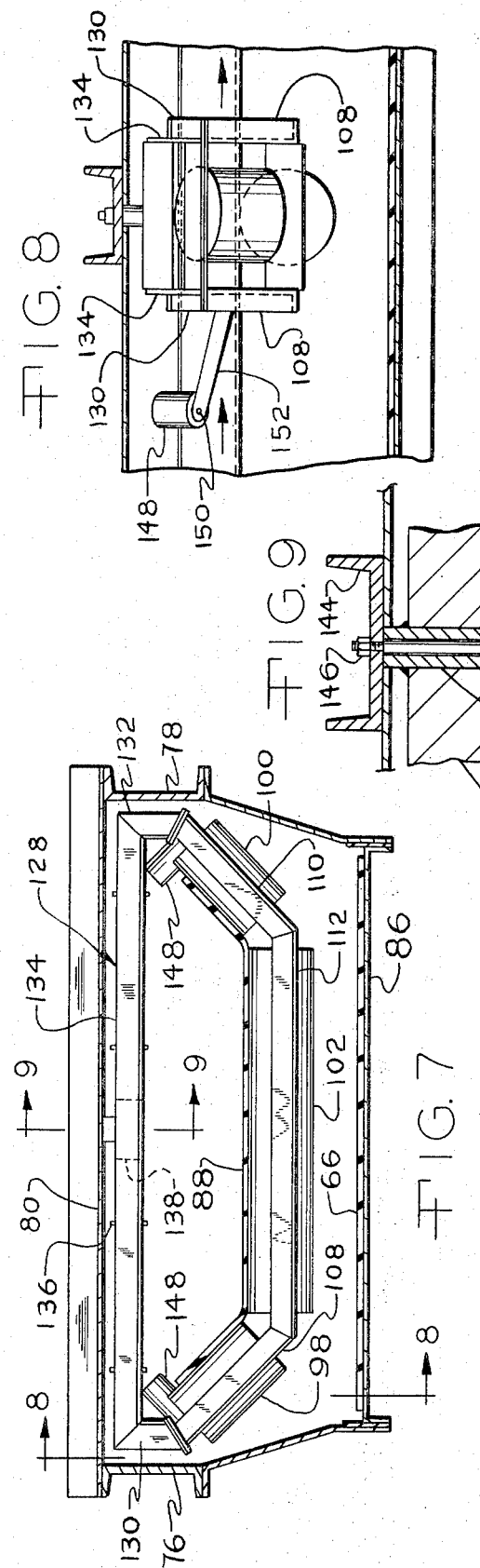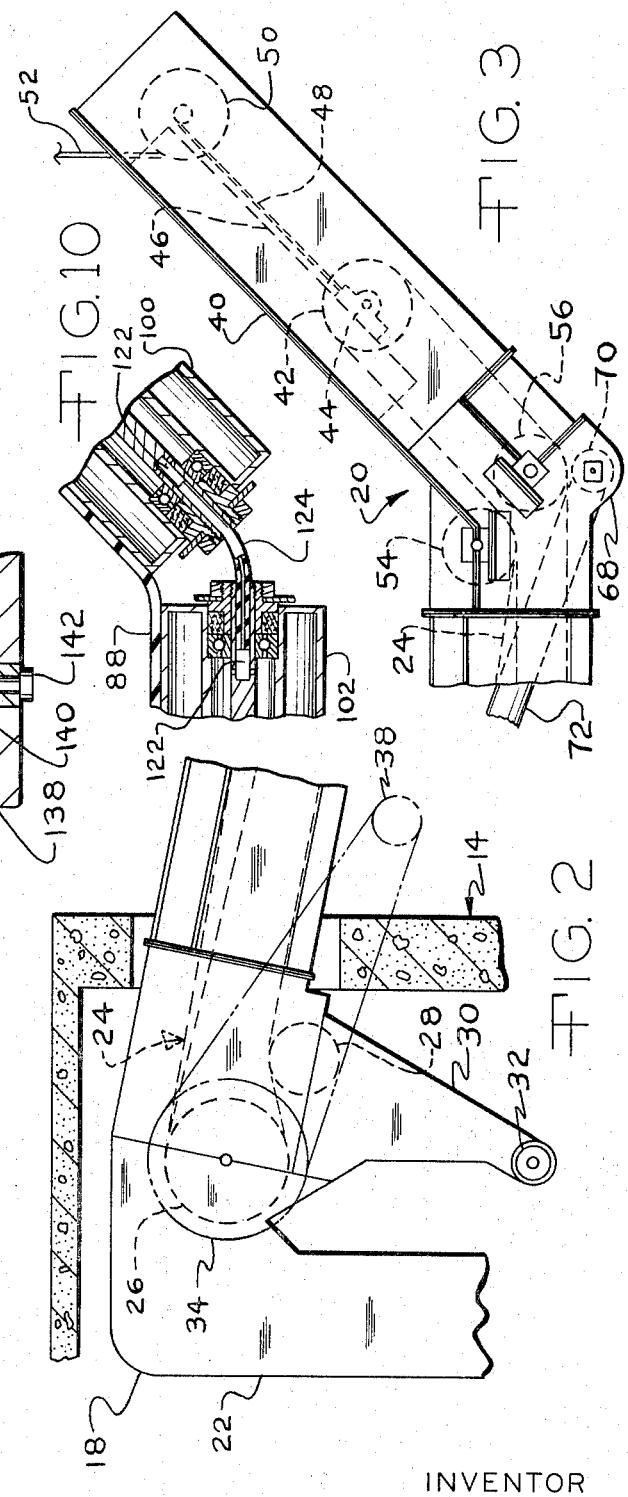

3,809,211

CONVEYOR SYSTEM

This invention relates to a conveyor system and more particularly to an enclosed conveyor for conveying grain and the like.

In conveying grain, air-borne fines or dust from the grain constitutes a serious problem in several respects. The dust presents an explosion hazard as well as a health hazard for workers in the area, with concomitant high insurance rates. The clean-up and maintenance problems also are substantial. Further, air-suction systems which are often inefficient or inadequate as well as being expensive, are eliminated, along with the problem of handling the dust which is collected in the system. Another very important but often not fully realized disadvantage is the monitary loss represented bu the dust which is disposed of rather than being sold commercially. Such loss can amount to many thousands of dollars annually.

In accordance with the invention, a fully enclosed conveyor system is provided which retains all dust within the enclosure to eliminate the aforementioned problems as well as returns the dust to the conveyor so that it can be sold equally well with the main supply of the grain. With the conveyor system totally enclosed, it is even possible to place the ambient air around the conveyor under a slight positive pressure so that if any leaks should occur in the system, as for example if an access opening is left ajar, the dust will still remain within the enclosure.

The new enclosed conveyor system includes idler assemblies for the upper run of the conveyor belt, which have idler rolls supported from longitudinally-extending structural members which can constitute part of the support for the enclosure. The supporting members are at the side of or above the idler rolls of the assembly. The idler assembly includes two angular side idler rolls and a central, substantially horizontal roll providing a trough-like support for the belt. The assembly is provided with a lubricating system to which lubricant can be supplied to all of the idler rolls from outside the enclosure. The lower run of the conveyor belt is directly below the upper run to receive spills therefrom and with idler rolls being supported from above, there are substantially no obstructions between the upper and lower runs which could otherwise collect some of the grain spilling from the upper run and present a cleaning and maintenance problem.

The lower run of the conveyor belt is supported directly on the bottom portion of the enclosure with no idlers being used at all to support this portion of the belt. Elimination of the idlers not only decreases the cost of the system but also substantially reduces the required over-all height for the enclosure. Grain spills and dust on and under the lower run of the belt are carried to the tail pulley at the charge end of the belt where the material can be collected and returned again to the upper run of the belt and carried again toward the discharge end. Thus, such material and particularly grain dust which heretofore has been a nuisance and an expense to dispose of now becomes part of the main stream of the grain and is sold accordingly with the grain. Over a period of time, the additional revenue from grain dust can constitute a substantial sum, particularly for larger operations.

The enclosed system also includes unique self-aligning idler assemblies which are pivotally supported from an upper wall of the enclosure. With this type of support, the self-aligning idler assemblies do not interfere at all with the belt and particularly the lower run thereof.

It is, therefore, a principal object of the invention to provide an enclosed conveying system for grain and the like with which air-borne fines or dust is a problem.

Another object of the invention is to provide an enclosed conveying system with idler assemblies supported from locations at the side of or above the idler rolls.

A further object of the invention is to provide an idler assembly in an enclosed conveying system, which system can be lubricated from outside the system.

Yet another object of the invention is to provide an enclosed conveying system for grain and the like in which the lower run of a conveying belt of the system is supported directly on the bottom of the enclosure.

Yet a further object of the invention is to provide an enclosed conveying system for grain and the like having collection means at the charge end thereof for returning spills and grain dust to the upper run of the conveyor.

Still another object of the invention is to provide an enclosed conveying system having self-aligning idler assemblies pivotally supported from above the upper run of the conveyor belt.

Other objects and advantages of the invention will be apparent from the following detailed description of a preferred embodiment thereof, reference being made to the accompanying drawing, in which:

FIG. 1 is a schematic view in elevation of an over-all conveying system embodying the invention;

FIG. 2 is a schematic, fragmentary side view in elevation of a discharge end of the conveying system of FIG. 1;

FIG. 3 is a somewhat schematic, fragmentary side view in elevation of the charge end of the conveying system of FIG. 1;

FIG. 4 is a view in perspective, with parts broken away and with parts in section of the charge end of the conveying system of FIG. 1, with collecting means shown for spills and dust;

FIG. 5 is a view in transverse cross section taken through the conveying system and showing an idler assembly with idler rolls rigidly supported from structural members extending longitudinally of the conveying system;

FIG. 6 is an enlarged view in cross section taken along the line 6—6 of FIG. 5;

FIG. 7 is a detailed, fragmentary view in cross section taken through adjacent end portions of two idler rolls;

FIG. 8 is a view in transverse cross section similar to FIG. 5 but showing a self-aligning idler assembly of the conveying system;

FIG. 9 is an end view in elevation of the idler assembly, taken along the line 9—9 of FIG. 8; and FIG. 10 is a fragmentary view in transverse cross section taken along the line 10—10 of FIG. 8.

Referring particularly to FIG. 1, an over-all conveying system according to the invention is indicated at 10. A typical system is in the order of 600 feet long and conveys grain from a plurality of storage silos (not shown), each having an enclosed charge chute 12, only one being shown, to the interior of a building 14. Much of the system 10 and the chute 12 can be located in a tunnel-like enclosure extending under the storage silos.

Each system is totally enclosed by an elongate or longitudinally extending enclosure 16, a discharge end enclosure 18, and a charge end enclosure 20. Heretofore, grain conveying systems have been open and the dust from the grain has constituted a potential dangerous explosion hazard and health hazard. Consequently, it has been necessary to provide ample and reliable air suction systems for the space around the conveying system. This has been expensive and also has resulted in increased costs in disposing of the collected dust. The dust also has constituted a maintenance and clean-up problem. The new conveying system can not only be enclosed but the space around the system can be placed under slight positive pressure so that if any leak should exist in the system, the dust will not escape.

The discharge end enclosure 18 is shown more particularly in FIG. 2. This enclosure forms a discharge chute 22 through which grain can be directed to a scale hopper, for example. The grain is discharged into the chute 22 from a belt 24 as the belt moves around a head pulley 26. The belt 24 then bends back around an idler pulley 28 with spills and dust being collected from the belt in a funnel-shapd chute 30 which communicates with a small screw conveyor 32 at the lower end. The conveyor 32 then carries such spills and dust to the discharge chute 22 by additional conveying means (not shown). In this instance, the head pulley 26 is driven through a driven sprocket 34, a chain 36, and a drive sprocket 38, although other drive arrangements can be employed.

The charge end enclosure 20 is shown more particularly in FIG. 3. The enclosure includes an inclined housing 40 in which is a tail pulley 42 mounted for longitudinal movement through bearing blocks 44 cooperating with guides 46. The bearing blocks 44 are connected by cables 48 with a take-up drum 50 connected to a counterweight (not shown) through a cable 52. The take-up is basically known in the art and will not be discussed in further detail.

The belt 24 is directed to the tail pulley 42 by an upper idler roll or pulley 54 and a wing-type clean-up pulley 56. The latter is shown in more detail in perspective in FIG. 4. It includes a plurality of radially-extending plates 58 having end flanges 60 thereon which engage the belt 24. The pulley further includes a double-conical hub 62 which has a diameter about equal to that of axles 64 near both outer ends and has a maximum diameter about equal to the diameters of the radially-extending plates 58 at the center. The double conical hub 62 pushes grain spills carried on top of a return or lower run 66 of the belt 24 off of the edges of the belt as it moves below the wing-type pulley 56. This grain falls into a trough 68 immediately below the pulley and is carried transversely beyond the belt 24 by a screw 70 in the trough. The grain is then conveyed to a slanted screw conveyor 72 (FIG. 1) located at one side of the enclosure 20 which carries the grain upwardly above the enclosure 16 to a slanted chute 74 which discharges the grain back on to the conveyor belt 24. The same conveying system also moves grain dust in the same manner. The dust is carried both on the return run 66 and underneath the return run and is moved by the belt into the trough 68 as the return run 66 travel toward the tail pulley 42.

Referring more particularly to FIG. 5, the longitudinally extending enclosure 16 includes two spaced, parallel structural members or stringers 76 and 78. These support a top 80 and sides 82 and 84, between which extends a lower panel or bottom 86. The overall height of the enclosure 16 is kept to a minimum by virtue of the fact that the return run 66 of the belt 24 is supported directly on the enclosed bottom 86 without the use of any idlers whatsoever. This also reduces the cost of the over-all conveying system. Even without the idlers, friction between the return run 66 and the bottom 86 is kept low because of the natural accumulation of a thin layer of grain dust between the two. Wear strips 87 are located along the edges of the bottom 86 to protect the sides 82 and 84 from the edges of the belt.

An upper run 88 of the belt 24 is maintained in a trough-like configuration, including slanted edge portions 90 and 92 and a horizontally-extending, central portion 94, by means of idler assemblies indicated at 96. These assemblies typically can be located as required, e.g. every five feet, along the conveying system. Each of the assemblies 96 includes angular edge idler rolls 98 and 100 and a central, horizontal idler roll 102. The idler rolls are rigidly supported by the structural members 76 and 78 through brackets 104 and 106. For this purpose two spaced, angular L-shaped elongate members 108 are affixed to the bracket 104 and extend downwardly and inwardly therefrom, with similar members 110 affixed to the bracket 106. These members can be fastened to the brackets 104 and 106 by any suitable means, such as by bolting. Two spaced, horizontally-extending L-shaped elongate members 112 extend between the lower ends of the members 108 and 110 and again can be affixed thereto through any suitable arrangement, such as by shop welding.

Near the ends of the idler rolls 98, 100 and 102 are transverse supporting plates or members 114 which extend between the associated elongate members. As shown in FIG. 6, these plates have central notches 116 therein to receive shafts or axles 118 of the idler rolls. The axles 118 can be affixed in the notches 116 of the plates 114 through suitable means such as nuts 120.

The idler rolls 98–102 have central passages 122 (FIG. 10) extending therethrough which are connected by lubricating tubes 124. The passages 122 and the tubes 124 provide a complete lubricating passage throughout the three idler rolls 98–102. Lubricant can then be supplied through all three rolls by means of a lube fitting 126 (FIG. 5) projecting outwardly from one or both of the structural members 76 and 78 so that all lubrication of the idler assemblies 24 can be performed from outside the enclosure 16. The three rolls can be pre-assembled with the nuts 120 and with the lubricating tubes 124, the rolls then being dropped into place in the notches 116 of the plates 114, after which the nuts are tightened.

By rigidly supporting the idler rolls 98–102 from locations to the side and preferably above, grain spills from the upper run 88 of the conveyor belt 24 can drop substantially unobstructedly onto the lower run 66. Thus there is a minimum chance of grain collecting on idler supports and constituting a clean-up and maintenance problem. This unique supporting system also enables the over-all conveyor to be narrower and more compact vertically than otherwise.

Because the belt 24 is totally enclosed, proper tracking thereof must be assured. Accordingly, self-aligning idler assemblies 128 (FIGS. 8-10) are employed at spaced intervals, such as 40 or 50 feet, along the conveyor system 10. The idler assembly 128 includes essentially the same idler rolls 98, 100 and 102 which are supported again by the transverse plates 114 extending between the elongate supporting members 108, 110 and 112. In this instance, however, the structural members 108 and 110 are affixed to short vertical supporting members 130 and 132 to form a U-shaped support for the rolls. The short members 130 and 132 are affixed to the ends of horizontally-extending structural members 134. These members are suitably supported in spaced relationship by transverse plates 136 and a central block 138 which carries a bearing sleeve 140 and a pivot pin or bolt 142. This extends through a top structural member 144 where it threadedly receives a nut 146 or other suitable fastening arrangement. With this pivotal support, the idler assembly 128 can pivot about a vertical axis without interfering in any manner with the return run 66 therebelow. Suitable stops can be provided to limit the pivotal movement of the idler assembly A pair of angularly disposed guide rolls 148 are rotatably mounted on axle pins 150 which are supported on arms 152. These are affixed to the structural members 108 and 110 and extend upstream of the idler rolls. The guide rolls 148 engage the edge of the upper run of the belt 24 and keep the belt in proper alignment at all times.

From the above, it will be seen that the conveying system according to the invention has many advantages over those heretofore known. The system provides a totally enclosed conveyor with means at the charge end to provide a positive return to the upper run of the conveyor belt of spills and dust carried to the charge end by the return run 66 of the belt. The system also provides a compact conveyor enclosure by the elimination of idler rolls for the return run 66 of the belt. The system further emcompasses a unique supporting arrangement for the idler rolls and a lubrication system therefor. The self-aligning rolls of the conveyor with the overhead pivotal support also provides an unobstructed, unique design.

Various modifications of the above described embodiment of the invention will be apparent to those skilled in the art, and it is to be understood that such modifications can be made without departing from the scope of the invention, if they are within the spirit and tenor of the accompanying claims.

I claim:

1. A self-contained, fully-enclosed, self-cleaning belt conveyor for moving particulate material, said conveyor comprising two spaced, parallel structural members;

elongate, angularly disposed, supporting means extending inwardly and downwardly from each of said structural members, affixed thereto, and supported thereby;

horizontal, elongate-supporting means extending between said angular supporting means and affixed thereto; an idler roll rotatably mounted on each of said supporting means, said idler rolls each having a central passage extending therethrough;

an enclosure fully enclosing said idlers, and said supporting means, said enclosure means forming a flat supporting surface below said idler rolls;

a belt having an upper run carried on said idler rolls and having a lower run supported directly on said supporting surface, with said lower run being in communication with said upper run to receive spills of particulate material from said upper run, only said supporting means and said idler rolls being disposed between said upper and lower runs;

a tail pulley;

a head pulley;

passage means connected between adjacent ends of said idler rolls and communicating with said central passages;

a lube fitting projecting outwardly from said enclosure for access from outside the enclosure, there being a fitting for each group of said idlers;

additional belt supporting means between some of said angular and horizontal supporting means and comprising additional angularly-disposed supporting means, additional horizontal supporting means extending between said additional angular supporting means, an additional idler roll mounted on each of said additional supporting means, supports connected to said additional angular supporting means, and pivot means pivotally supporting said supports from an upper portion of said enclosure;

means located near said tail pulley for removing particulate material from the upper surface of said lower run of said belt by engaging the upper surface and moving particulate material thereon transversely off the side edges of the lower run of said belt;

and means for moving the removed particulate material to the upper run of said belt.

2. A self-cleaning belt conveyor according to claim 1 characterized by said removing means comprising a trough communicating with the upper surface of the lower run of said belt for receiving particulate material from said lower run of said belt;

a conveyor screw in said trough for carrying the particulate material to one side of said belt; and said moving means for moving the removing particulate material to the upper run of said belt comprises a slanted screw conveyor communicating with said trough and having an end communicating with the upper surface of the upper run of said belt near said tail pulley for transferring particulate material from the lower run of said belt to the upper run of said belt, prior to reaching said tail pulley.

3. A self-contained, fully-enclosed, self-cleaning belt conveyor for moving particulate material, said conveyor comprising two spaced, parallel structural members;

two elongate, angularly-disposed supporting members extending inwardly and downwardly from each of said structural members and affixed thereto;

two horizontal, elongate-supporting members extending between lower ends of said angular supporting members and affixed thereto;

transverse support means extending between said angularly-disposed supporting members and between said horizontal supporting members;

idler rolls rotatably mounted in said transverse support means, said idler rolls being disposed in a generally U-shaped configuration and with at least a substantial portion of said idler rolls being located below said structural members and being supported solely thereby;

a belt;

means forming a smooth, flat surface directly below said idler rolls and receiving and directly supporting the lower run of said belt, an upper run of which is supported on said idler rolls;

a head pulley;

a tail pulley;

an enclosure enclosing said belt, said idlers, said pulleys, and said supporting means;

additional angular supporting means and additional horizontal supporting means extending between said additional angular means and located at spaced positions along said conveyor;

an additional idler roll mounted on each of said additional supporting means;

supports connected to said additional angular supporting means;

pivot means pivotally supporting said supports from an upper portion of said enclosure;

means forming a trough extending transversely below the lower run of said belt and beyond both side edges of the lower run near said tail pulley for receiving and collecting particulate material on the upper surface of the lower run of said belt prior to reaching said tail pulley;

means engaging the upper surface of the lower run of said belt for pushing material thereon off the sides of said belt and into said trough;

conveyor means in said trough for carrying the particulate material to one end of said trough;

and additional conveying means for carrying the particulate material back from the end of said trough to the upper surface of the upper run of said belt.

* * * * *

UNITED STATES PATENT OFFICE
CERTIFICATE OF CORRECTION

Patent No. 3,809,211  Dated May 7, 1974

Inventor(s) Benjamin A. Padilla

It is certified that error appears in the above-identified patent and that said Letters Patent are hereby corrected as shown below:

In the specification:

Column 1, line 16, correct the spelling of "by".
    Column 5, line 12, correct the spelling of "rolls".
    Column 6, line 2, after "enclosure" insert --including--.
    Column 6, line 45, change "removing" to --removed--.

Signed and sealed this 10th day of September 1974.

(SEAL)
Attest:

McCOY M. GIBSON, JR.           C. MARSHALL DANN
Attesting Officer               Commissioner of Patents